United States Patent
Kwok et al.

(10) Patent No.: US 11,893,633 B2
(45) Date of Patent: Feb. 6, 2024

(54) ADJUSTMENT OF CARD CONFIGURATIONS FOR FLIGHT INTERRUPTIONS

(71) Applicant: Capital One Services, LLC, McLean, VA (US)

(72) Inventors: Jennifer Kwok, New York, NY (US); Daniel Miller, Astoria, NY (US); Lisa Guo, Herndon, VA (US); Xiaoguang Zhu, Great Neck, NY (US); Alexander Lin, Arlington, VA (US); Vyjayanthi Vadrevu, Pflugerville, TX (US); Cameron Noah, Bethesda, MD (US)

(73) Assignee: Capital One Services, LLC, McLean, VA (US)

( * ) Notice: Subject to any disclaimer, the term of this patent is extended or adjusted under 35 U.S.C. 154(b) by 82 days.

(21) Appl. No.: 17/404,629

(22) Filed: Aug. 17, 2021

(65) Prior Publication Data

US 2023/0055897 A1 Feb. 23, 2023

(51) Int. Cl.
*G06Q 40/03* (2023.01)
*G06Q 50/30* (2012.01)
(Continued)

(52) U.S. Cl.
CPC ......... *G06Q 40/03* (2023.01); *G06Q 20/4015* (2020.05); *G06Q 30/01* (2013.01); *G06Q 50/30* (2013.01)

(58) Field of Classification Search
CPC .. G06Q 40/025; G06Q 20/4015; G06Q 30/01; G06Q 50/30
See application file for complete search history.

(56) References Cited

U.S. PATENT DOCUMENTS

| 2003/0085808 A1* | 5/2003 | Goldberg | G06Q 10/06 340/988 |
| 2016/0171546 A1* | 6/2016 | Gartenberg | G06Q 30/0261 705/14.58 |

(Continued)

FOREIGN PATENT DOCUMENTS

| WO | WO-2005077066 A2 * | 8/2005 | G06Q 10/02 |
| WO | WO-2020240177 A1 * | 12/2020 | G06N 20/20 |

OTHER PUBLICATIONS

Aviation Big Data and Machine Learning, in IEEE Transactions on Vehicular Technology, vol. 69, No. 1, pp. 140-150, Jan. 2020. (Year: 2020).*

(Continued)

*Primary Examiner* — Virpi H Kanervo
(74) *Attorney, Agent, or Firm* — Banner & Witcoff, Ltd.

(57) ABSTRACT

Systems, apparatuses, and methods are described for adjustment of card configurations for flight interruptions. Past flight interruptions that users experienced may be determined. Transactions conducted via the users' payment cards during the past flight interruptions may be determined. The data may be used for determining customized metrics for adjusting card configurations of the payment cards during current flight interruptions. Default metrics for adjusting card configurations of the payment cards during current flight interruptions may be determined. Current flight statuses may be monitored for the users. Current flight interruptions may be detected for the users. Card configurations of the payment cards may be adjusted during the detected current flight interruptions.

20 Claims, 11 Drawing Sheets

(51) Int. Cl.
  *G06Q 30/01* (2023.01)
  *G06Q 20/40* (2012.01)

(56) References Cited

U.S. PATENT DOCUMENTS

2018/0337875 A1* 11/2018 Friio ..................... H04L 67/133
2020/0372536 A1* 11/2020 Scislowski ........... G06Q 20/227

OTHER PUBLICATIONS

A. Dal Pozzolo, G. Boracchi, O. Caelen, C. Alippi and G. Bontempi, "Credit Card Fraud Detection: A Realistic Modeling and a Novel Learning Strategy," in IEEE Transactions on Neural Networks and Learning Systems, vol. 29, No. 8, pp. 3784-3797, Aug. 2018. (Year: 2018).*

* cited by examiner

Flight interruption data — 500

| Flight | Date and/or time | Departure | Destination | Extent of interruption | Other information |
|---|---|---|---|---|---|
| ABCDE 578 | 2/10/2019 10:30 | IAD | ORD | Delayed 1 hour | |
| EFGHI 234 | 5/7/2019 19:30 | LAS | JFK | Delayed 12 hours | |
| QWERTY 054 | 6/15/2019 13:10 | BUF | OMA | Canceled | |

551 — ABCDE 578
553 — EFGHI 234
555 — QWERTY 054

FIG. 5

User transaction data – UserA ⟵ 600

| Transaction | Amount | Date and/or time | Merchant | Other information |
|---|---|---|---|---|
| 651 Purchasing EFGHI flight ticket SJFOIWJV_43298 | $425.15 | 5/5/2019 21:30 | EFGHI | Booked EFGHI_234_5/7/2019_19:30 |
| 653 Tasty food dining APOINSDFOIJ_123157 | $51.23 | 5/6/2019 19:21 | Tasty food | |
| 655 Good pizza dining VNSLJOFI_52434 | $25.03 | 5/7/2019 20:23 | Good pizza | |
| 657 Traveler's lodge FJFAOPSFJOI_154234 | $254.12 | 5/7/2019 22:03 | Traveler's lodge | |
| 659 Traveler's lodge VNSOIWJFSI_723413 | $302.87 | 5/9/2019 21:43 | Traveler's lodge | |

FIG. 6

User flight data

| | Flight identification | User identification |
|---|---|---|
| 751 | ABCDE 578<br>2/10/2019 10:30 | UserC |
| 753 | ABCDE 578<br>2/10/2019 10:30 | UserD |
| 755 | EFGHI 234<br>5/7/2019 19:30 | UserA |
| 757 | EFGHI 234<br>5/7/2019 19:30 | UserB |

FIG. 7

Records for UserA

| Flight interruption | Flight interruption information | Associated transactions | | | | Amount and/or types of spending | Other information |
|---|---|---|---|---|---|---|---|
| EFGHI 234 5/7/2019 19:30 | Departure LAS; Destination JFK; Extent of interruption Delayed 12 hours | Good pizza dining VNSLJOFI_52434 | $25.03 | 5/7/2019 20:23 | Good pizza | Total amount: $279.15; Types: dining, lodging | |
| | | Traveler's lodge FJFAOPSFJOI_154234 | $254.12 | 5/7/2019 22:03 | Traveler's lodge | | |

ADJUSTMENT OF CARD CONFIGURATIONS FOR FLIGHT INTERRUPTIONS

TECHNICAL FIELD

The present disclosure is generally related to adjustment of card configurations for flight interruptions.

BACKGROUND

Users may use payment cards to conduct various types of transactions, and may use the payment cards during travel. When a user experiences a flight interruption, the user may potentially conduct additional transactions via the user's payment card(s) during the flight interruption, such as to reserve a hotel room, to reserve another flight, to purchase a meal at the airport, and/or the like. If configurations of the payment card(s) do not allow one or more of the transactions to be conducted, it may contribute to causing inconvenience and/or frustration to the user during the flight interruption.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, apparatuses, and methods are described for adjustment of card configurations for flight interruptions. Past flight interruptions that users experienced may be determined. Transactions conducted via the users' payment cards during the past flight interruptions may be determined. The data may be used for determining customized metrics for adjusting card configurations of the payment cards during current flight interruptions. Default metrics for adjusting card configurations of the payment cards during current flight interruptions may be determined. Current flight statuses may be monitored for the users. Current flight interruptions may be detected for the users. Card configurations of the payment cards may be adjusted during the detected current flight interruptions.

A computing device may receive flight interruption data indicating a plurality of past flight interruptions. The computing device may receive user transaction data indicating card transactions associated with a plurality of users. The computing device may determine, based on the flight interruption data and the user transaction data, one or more records for a user of the plurality of users. Each record of the one or more records for the user may indicate a past flight interruption and one or more card transactions associated with the past flight interruption. The one or more card transactions may be performed via a card associated with the user. The computing device may detect a current flight interruption associated with the user. In response to the detecting the current flight interruption associated with the user, the computing device may determine, based on the one or more records for the user, one or more predicted configurations for the card associated with the user. The computing device may update, based on the one or more predicted configurations, one or more card configurations of the card associated with the user.

In some examples, the determining the one or more records for the user may be further based on data indicating a mapping of a past flight interruption to one or more affected users.

In some examples, the card associated with the user may comprise a credit card or a virtual card.

In some examples, the one or more predicted configurations may comprise one or more of a predicted amount of available credit or a predicted set of transaction types.

In some examples, the determining the one or more predicted configurations may comprise: selecting, based on the current flight interruption and from the one or more records for the user, at least one record; and determining, based on the at least one record, the one or more predicted configurations.

In some examples, the determining the one or more predicted configurations may be further based on one or more of a date of the current flight interruption, a time of the current flight interruption, a departure location associated with the current flight interruption, or a destination location associated with the current flight interruption.

In some examples, the computing device may send, to a user device associated with the user, a notification of the updating the one or more card configurations.

In some examples, the computing device may determine, based on the flight interruption data and the user transaction data, one or more default configurations for card usage following flight interruptions.

In some examples, the computing device may detect a current flight interruption associated with a second user. In response to the detecting the current flight interruption associated with the second user, and based on determining that a confidence score of one or more predicted configurations for a card associated with the second user does not satisfy a threshold, the computing device may update, based on the one or more default configurations, one or more card configurations of the card associated with the second user.

In some examples, the computing device may, based on determining an expiration of a duration of the current flight interruption, reset the one or more card configurations.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 5 shows an example of flight interruption data in accordance with one or more aspects described herein.

FIG. 6 shows an example of user transaction data in accordance with one or more aspects described herein.

FIG. 7 shows an example of user flight data in accordance with one or more aspects described herein.

FIG. 8 shows an example of records for a user in accordance with one or more aspects described herein.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to systems, apparatuses, non-transitory computer-readable media, methods, and/or techniques for adjustment of card configurations for flight interruptions. Past flight interruptions that users experienced may be determined. Transactions conducted via the users' payment cards during the past flight interruptions may be determined. The data may be used for determining customized metrics for adjusting card configurations of the payment cards during current flight interruptions. Default metrics for adjusting card configurations of the payment cards during current flight interruptions may be determined. Current flight statuses may be monitored for the users. Current flight interruptions may be detected for the users. Card configurations of the payment cards may be adjusted during the detected current flight interruptions.

Figure 1:
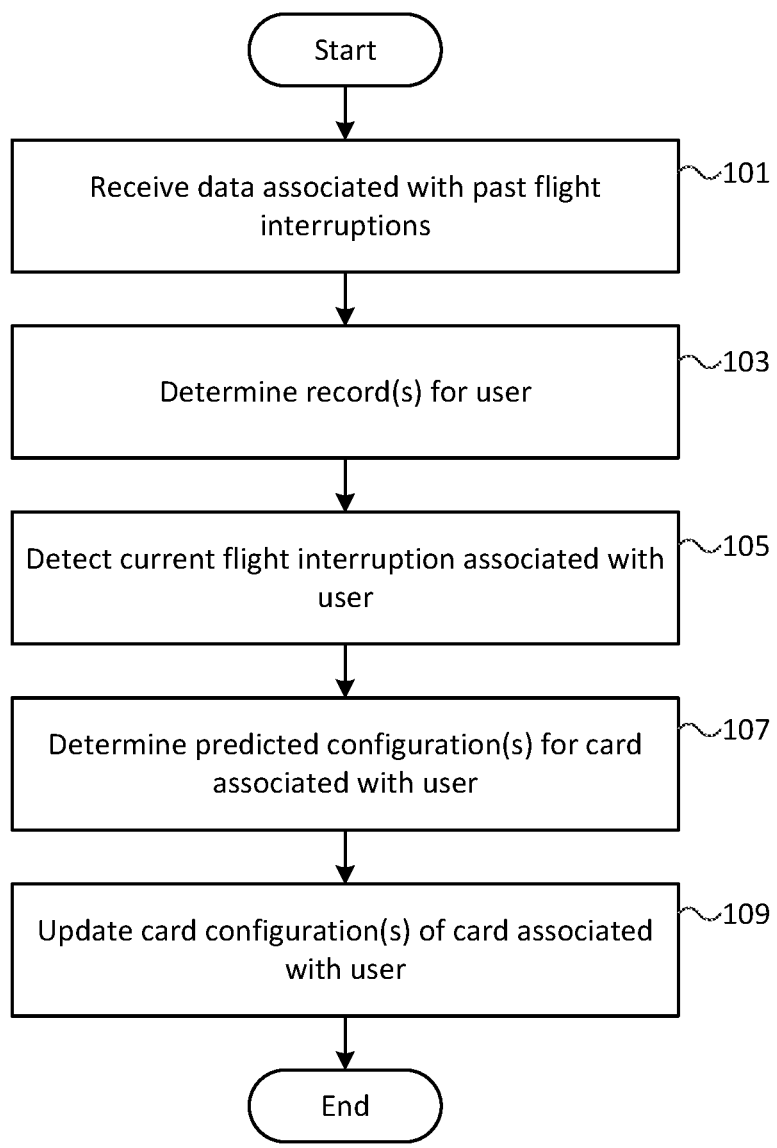
FIG. 1 is a flowchart showing an example of a method for adjustment of card configurations for flight interruptions in accordance with one or more aspects described herein.

FIG. 1 is a flowchart showing an example of a method for adjustment of card configurations for flight interruptions in accordance with one or more aspects described herein. The method may be performed by any type of computing device (e.g., a computing device as described herein). In step 101, a computing device may receive data associated with past flight interruptions. The computing device may receive flight interruption data indicating a plurality of past flight interruptions. The computing device may receive user transaction data indicating card transactions associated with a plurality of users. In step 103, the computing device may determine, based on the flight interruption data and the user transaction data, one or more records for a user of the plurality of users. Each record of the one or more records for the user may indicate a past flight interruption and one or more card transactions associated with the past flight interruption. The one or more card transactions may have been performed via a card associated with the user. In step 105, the computing device may detect a current flight interruption associated with the user. In step 107, the computing device may, in response to the detecting the current flight interruption associated with the user, determine, based on the one or more records for the user, one or more predicted configurations for the card associated with the user. In step 109, the computing device may update, based on the one or more predicted configurations, one or more card configurations of the card associated with the user.

Figure 2:
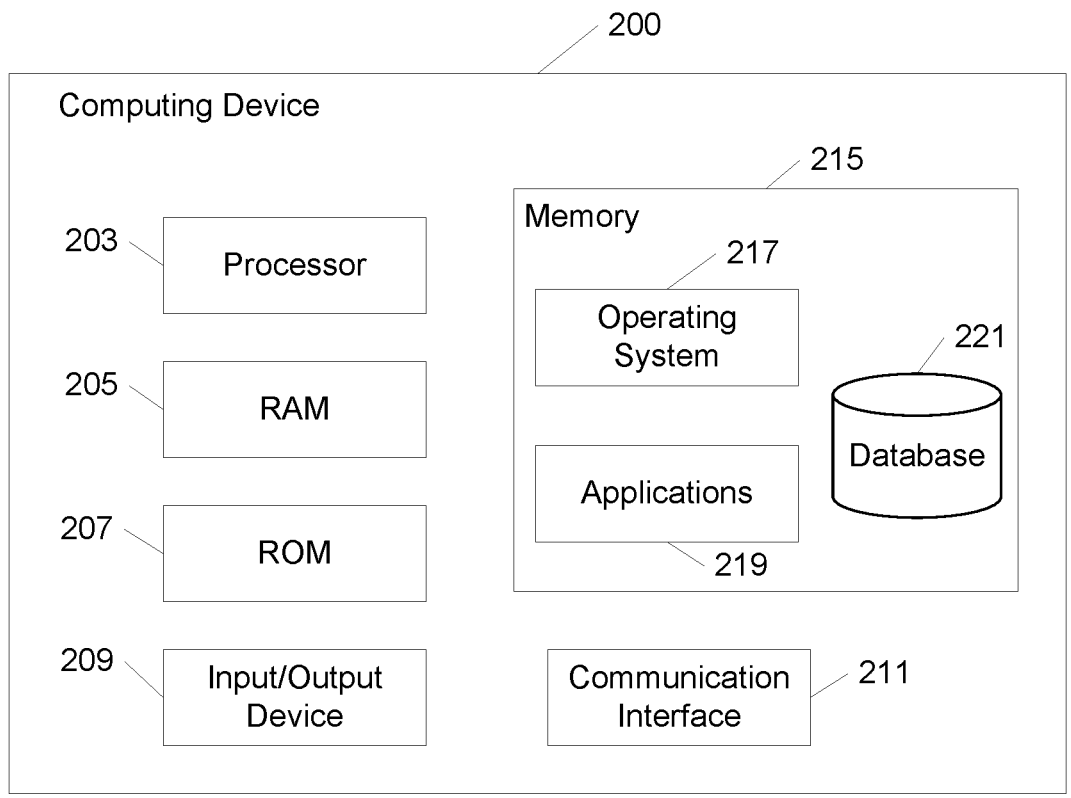
FIG. 2 shows an example computing device in accordance with one or more aspects described herein.

Turning now to FIG. 2, a conceptual illustration of a computing device 200 that may be used to perform any of the techniques as described herein is shown. Hardware elements of the computing device 200 may be used to implement any of the computing devices discussed herein. The computing device 200 may be used to implement any of the components and/or functionalities shown in FIG. 3 (e.g., the database 307, the querying and processing functionality 309, the flight interruption detection functionality 311, the card configuration adjustment functionality 317, and/or the notification functionality 319), and/or may be used to implement any of the processes and/or methods as discussed herein (e.g., as described in connection with FIGS. 1, 4A-4C). Hardware elements of the computing device 200 may be used to implement any of the computing devices shown in FIG. 9 (e.g., the server 901, the merchant device 905, the user device 907, the flight interruption data device 909, the user transaction data device 917, the user flight data device 913, the current flight status data device 915, and/or other devices) and/or any other computing devices discussed herein.

The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the scope of the disclosure provided herein.

Figure 3:
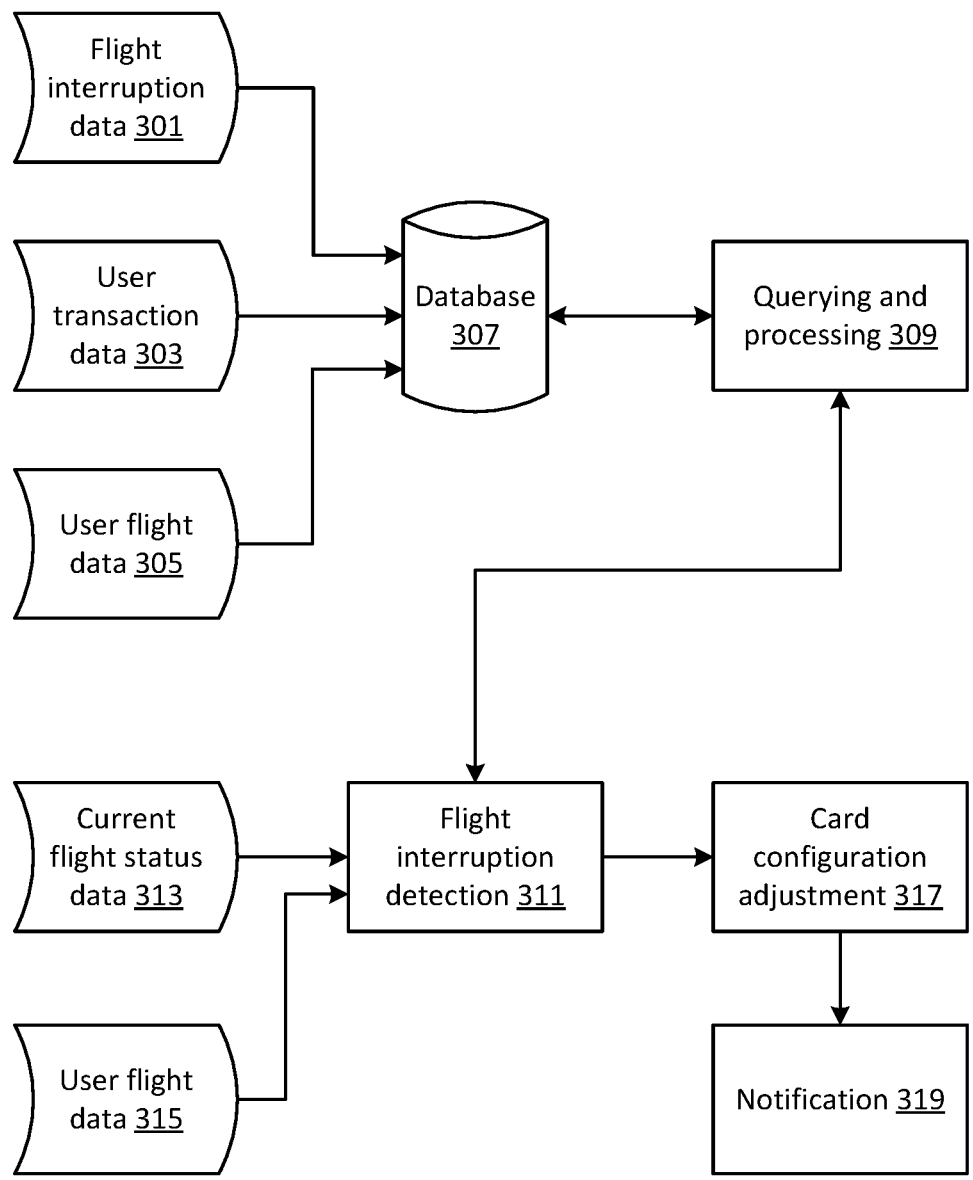
FIG. 3 is a schematic diagram showing an example process for adjusting card configurations for flight interruptions in accordance with one or more aspects described herein.

FIG. 3 is a schematic diagram showing an example process for adjusting card configurations for flight interruptions in accordance with one or more aspects described herein. The process may be implemented by one or more computing devices (e.g., the computing device described in connection with FIG. 2). The process may be implemented or performed, for example, by one or more of the system as described in connection with FIG. 9. The process may be distributed across multiple computing devices, or may be performed by a single computing device.

The process may use various types of data (e.g., flight interruption data 301, user transaction data 303, user flight data 305, current flight status data 313, and user flight data 315), one or more databases (e.g., database 307), one or more querying and processing functionalities (e.g., querying and processing functionality 309), one or more flight interruption detection functionalities (e.g., flight interruption detection functionality 311), one or more card configuration adjustment functionalities (e.g., card configuration adjustment functionality 317), and one or more notification functionalities (e.g., notification functionality 319). The database 307 may comprise any type of database system. The database 307 may comprise, for example, a database (e.g., AMAZON S3, ORACLE Database, MySQL, MICROSOFT SQL Server, IBM DB2, etc.).

The database 307 (e.g., implemented by a computing device) may receive the flight interruption data 301 (e.g., from a computing device managed by an airline). The flight interruption data 301 may indicate one or more instances of flight interruptions. More details regarding the flight interruption data 301 are described in connection with FIG. 5.

The database 307 may receive the user transaction data 303 (e.g., from a computing device managed by an entity issuing payment cards). The user transaction data 303 may indicate one or more transactions performed via payment cards possessed by various users. More details regarding the user transaction data 303 are described in connection with FIG. 6.

The database 307 may receive the user flight data 305. The user flight data 305 may indicate a mapping between flights and users. For example, the user flight data 305 may indicated which users are passengers of a particular flight. The user flight data 305 may be, for example, received from a computing device managed by an airline. Additionally or alternatively, the user flight data 305 may be determined based on the user transaction data 303. For example, the user transaction data 303 may indicate a transaction where a user purchased a ticket for a particular flight, and the indicated transaction may include information identifying the user and information identifying the user's flight. More details regarding the user flight data 305 are described in connection with FIG. 7.

The flight interruption data 301, the user transaction data 303, and the user flight data 305 may be stored in the database 307. The querying and processing functionality 309 may query and/or process the data stored in the database 307. For example, the querying and processing functionality 309 may retrieve, from the database 307, data for a user of the system, and may generate, based on the retrieved data, one or more records for the user, wherein each of the one or more records may indicate a particular flight interruption that the user experienced, and one or more transactions performed via the user's cards during the flight interruption period. The querying may be performed, for example, by any type of method for database querying. In some examples, the querying may be performed, for example, using a querying service (e.g., AWS ATHENA, SQL, etc.). More details regarding such generated records are described in connection with FIG. 8. The records generated for the user may be used for determining customized adjustments to card configurations of the user's cards (e.g., credit cards, virtual cards, etc.) during a future flight interruption, as described in greater detail below.

Users of payment cards (such as credit cards or virtual cards) may use the cards for conducting their transactions. For example, they may use the cards to perform transactions associated with air travel, including purchasing flight tickets, purchasing transportation to and from airports, purchasing meals at airports, etc. The flights of air travel may experience schedule interruptions, such as delays or cancellations. During inconvenient situations such as flight interruptions, a user may need to spend more time around his or her flight departure locality (e.g., to wait out the flight delay, or to manage to purchase a ticket for another flight and wait to take the other flight). Additional spending may be incurred during a flight interruption, such as reserving a hotel room, purchasing a new flight ticket, or purchasing a meal. If the user's payment cards do not have a sufficient amount of available credit during the flight interruption, the user might not be able to rely on his or her payment cards for the additional transactions, and it may contribute to causing additional user inconvenience and/or frustration during the flight interruption.

Adjusting card configurations for flight interruptions may help alleviate the challenges discussed above. A computing device (e.g., implementing the flight interruption detection functionality 311) may be configured to monitor status of various flights of the users of the system. The computing device may detect a flight interruption for a user, and may determine one or more adjustments to card configurations of the user's payment card during a period of the detected flight interruption. The card configurations subject to potential adjustments may comprise, for example, the credit limit associated with a credit card or virtual card, or the fraud rules associated with a credit card or virtual card. The one or more adjustments may be determined based on the records generated for the user (as described above and as described in greater detail in connection with FIG. 8). For example, the computing device may select, from the records generated for the user, at least one record indicating a past flight interruption that is approximate to the detected current flight interruption based on the date of the flight, the time of the flight, the departure location of the flight, the destination location of the flight, the fare class (e.g., of the user's ticket to the flight) (e.g., business class, economy class, etc.), the underlying reason of the flight interruption, whether or to what extent the airline compensates for the flight interruption (e.g., whether the airline refunds the cost of the ticket to the interrupted flight, whether the airline compensates for the cost of booking another flight, whether the airline compensates for dining, lodging, and/or other types of spending due to the flight interruption, etc.), and/or other factors associated with flight interruptions. Additionally or alternatively, the one or more adjustments may be determined in various other manners as described herein. The one or more adjustments may comprise one or more default adjustments, for example, if the confidence in the accuracy of the customized adjustments determined based on the generated user-specific records does not satisfy a threshold level. More details regarding determining adjustments to card configurations for flight interruptions are described in connection with FIGS. 4A-4C.

The monitoring, by a computing device, of current status of various flights of the users of the system may be based on, for example, the current flight status data 313 and the user flight data 315. The computing device may receive the current flight status data 313 and the user flight data 315. The current flight status data 313 may indicate whether each of one or more flights is currently in a status of being interrupted (e.g., delayed, canceled, etc.). The current flight status data 313 may be received in real-time (e.g., from devices associated with airlines). In some examples, the current flight status data 313 may be, for example, received from an entity managing aviation and/or travel data (e.g., via an application programming interface (API)). In some examples, the current flight status data 313 may indicate, to the flight interruption detection functionality 311, that the status of a flight is changing to being interrupted. The indications of flight interruptions in the current flight status data 313 may be in a format that is similar to the format of the flight interruption data 301 (e.g., as described in greater detail in FIG. 5).

The user flight data 315 may be in a format that is similar to the format of the user flight data 305. The user flight data 315 may indicate a mapping between flights and users. For example, the user flight data 315 may indicated which users are passengers of a particular flight. The user flight data 315 may be, for example, received from a computing device managed by an airline. Additionally or alternatively, the user flight data 315 may be determined based on the user transaction data 303. For example, the user transaction data 303 may indicate a transaction where a user purchased a ticket for a particular flight, and the indicated transaction may include information identifying the user and information identifying the user's flight. More details regarding the user flight data 315 are described in connection with FIG. 7.

Based on the current flight status data 313 and/or the user flight data 315, the flight interruption detection functionality 311 may detect current flight interruptions experienced by users of the system. After detecting a particular current flight interruption that a user is experiencing, the flight interruption detection functionality 311 may determine one or more adjustments to card configurations of the user's card. The one or more determined adjustments may be implemented by the card configuration adjustment functionality 317. For example, the card configuration adjustment functionality 317 may update, based on the determined adjustments, the card configurations of the user card.

The notification functionality 319 may be configured to send, to user devices, notifications of one or more of the implemented adjustments. For example, the notification functionality 319 may (via email, text message, push notification, and/or the like) notify a user that the credit limit of the user's credit card has been temporarily increased for the duration of a detected flight interruption that the user is experiencing.

In some examples, a computing device may detect a current flight interruption, and the computing device may, based on received data, automatically adjust temporary credit limits and/or fraud rules for payment card(s) possessed by users affected by the detected current flight interruption. When users are impacted by flight interruptions, users may potentially spend more than usual (e.g., to book unexpected accommodation, to book another flight, to pay for another meal at the airport, etc.). The users may use one or more payment cards (e.g., credit card, virtual card, etc.) for the spending. An entity issuing and/or managing the user's payment cards may adjust card configurations for flight interruptions as described herein, so that the users might not be prevented from making those purchases and user experience may be improved. In some examples, a computing device may use past credit card transaction data and external third-party application programming interfaces (APIs) on flight statuses to predict (e.g., using a machine learning model) how much users may spend when impacted by flight interruptions. The computing device may store data on what airline a user is flying, departure and/or arrival locations, flight date, and any transactions made post-interruption. The computing device may determine what flight the user is on and if the flight is canceled and/or delayed (e.g., based on third-party data). Based on this information, the computing device may automatically adjust temporary credit limits and/or fraud rules for impacted users. In some examples, for temporary credit limit adjustments, a notification engine associated with the system may trigger an alert to users so that the users may be aware of the adjustments. In some examples, for temporary fraud rules adjustments, notifications might not be sent to users.

Figure 4A:
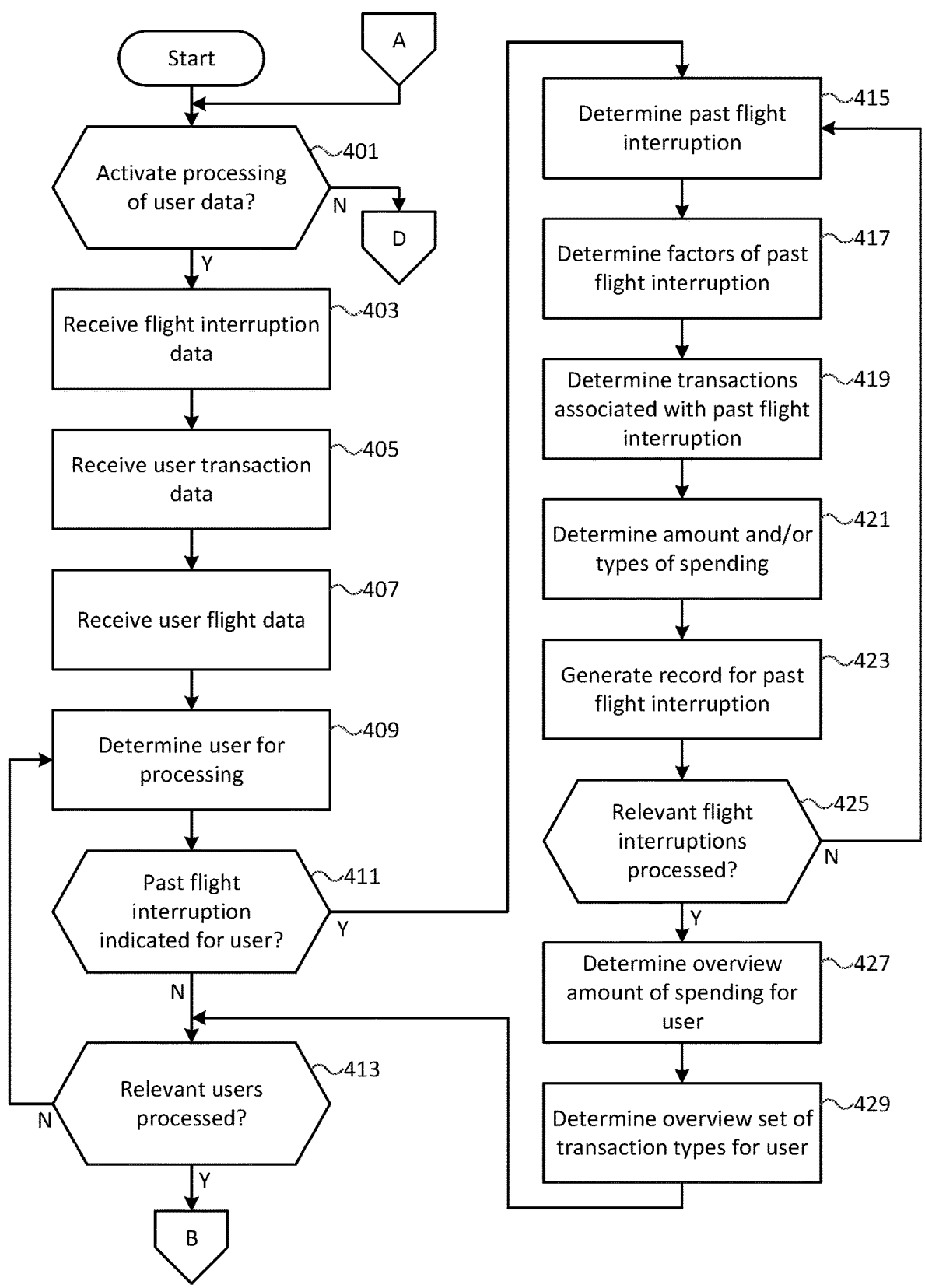
FIGS. 4A-4C show a flowchart of an example method for adjusting card configurations for flight interruptions in accordance with one or more aspects described herein.
Figure 4B:
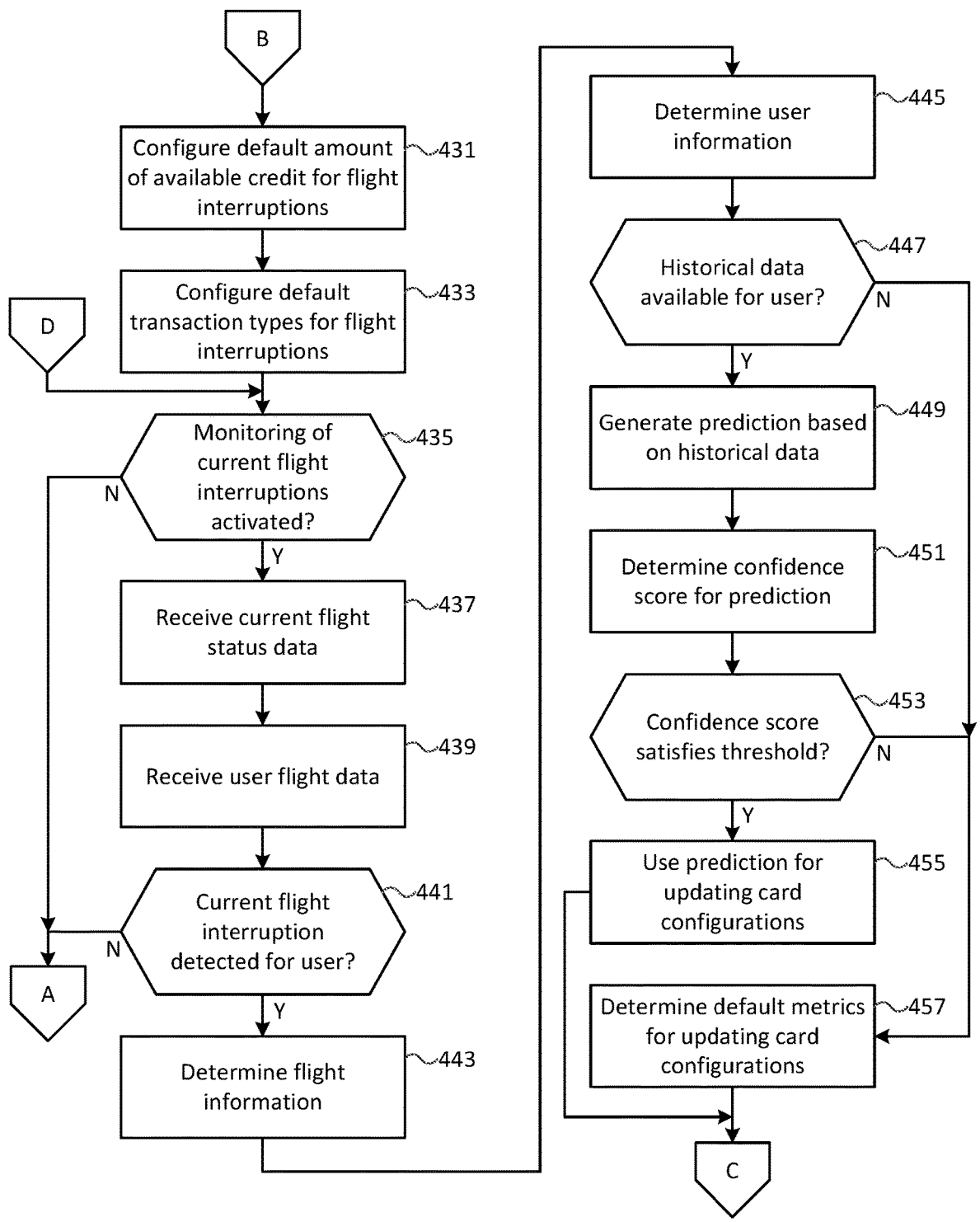
Figure 4C:
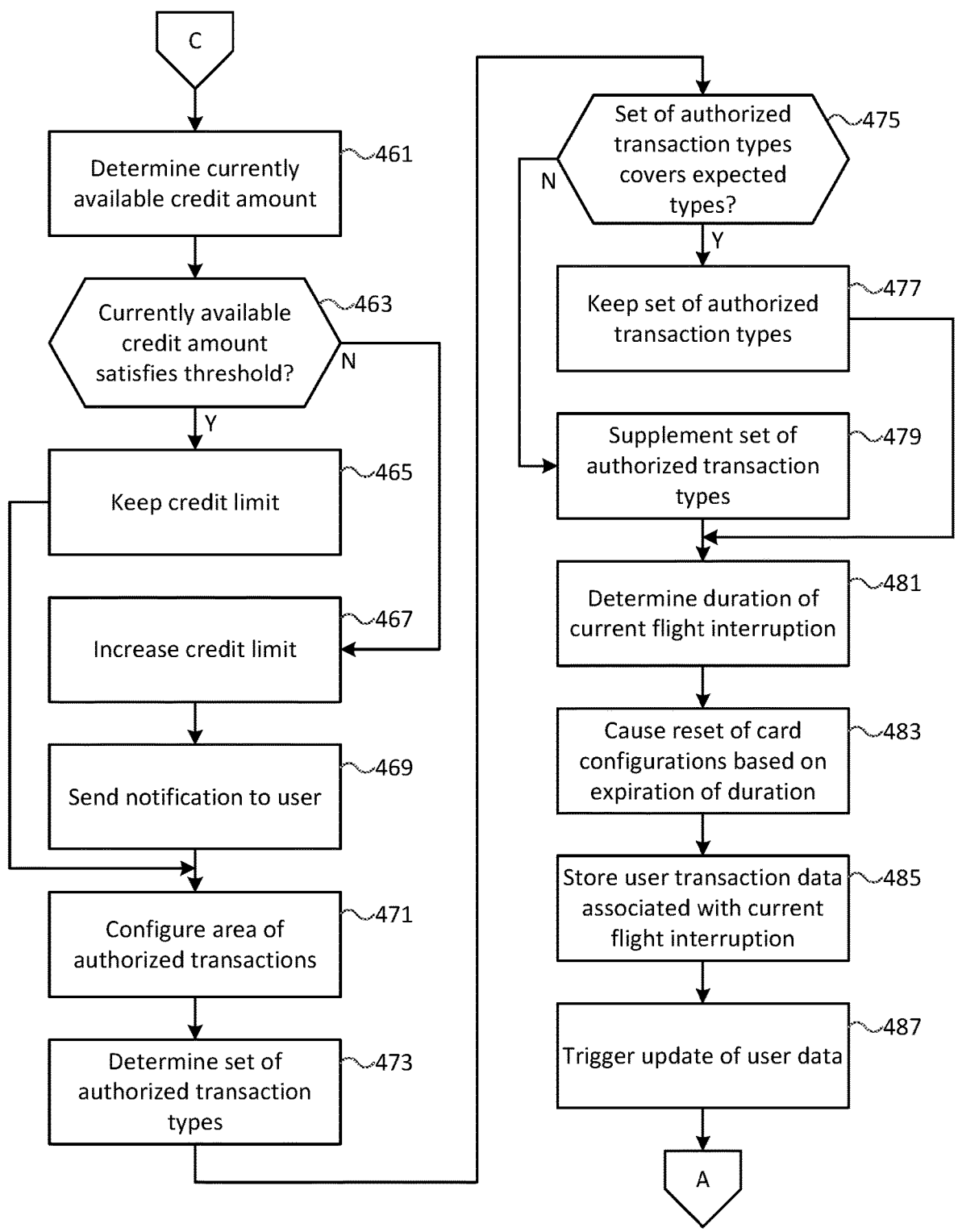

FIGS. 4A-4C show a flowchart of an example method for adjusting card configurations for flight interruptions in accordance with one or more aspects described herein. The method may be performed, for example, by one or more of the computing device as described in connection with FIG. 2. The method may be performed, for example, using one or more of the processes as described in connection with FIG. 3. The method may be implemented or performed, for example, by one or more of the system as described in connection with FIG. 9. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

In step 401, a computing device (e.g., the server 901) may determine whether to activate processing of user data. The user data to be processed may comprise, for example, various types of historical data, such as the flight interruption data 301, the user transaction data 303, and/or the user flight data 305. The processing of user data may produce metrics or intermediate data entries, which may be used for determining adjustments to card configurations for a detected current flight interruption. The computing device may be configured to, for example, periodically activate processing of user data based on a frequency (e.g., which may be set by an administrator). Additionally or alternatively, the computing device may be configured to activate processing of user data based on detecting certain triggering events, such as an event where new user data are received and become available. The computing device may be configured to activate processing of user data after a particular time period or as triggered manually by an administrator. If the computing device determines to activate processing of user data (step 401: Y), the method may proceed to step 403. If the computing device determines not to activate processing of user data (step 401: N), the method may proceed to step 435 (FIG. 4B).

In step 403, the computing device may receive flight interruption data (e.g., the flight interruption data 301). The flight interruption data may be received from, for example, devices associated with airlines. The flight interruption data may indicate, for example, one or more instances of past flight interruptions. For each indicated past flight interruption, the flight interruption data may also comprise the flight identifier (e.g., airline name and flight number), the date and/or time of the flight, the departure location of the flight, the destination location of the flight, the extent of the interruption, and/or other information associated with the flight interruption.

In step 405, the computing device may receive user transaction data (e.g., the user transaction data 303). The user transaction data may be received from, for example, devices associated with an entity issuing payment cards (e.g., credit cards or virtual cards). In some examples, the computing device may be also managed by the entity issuing payment cards. The user transaction data may indicate, for example, one or more posted transactions conducted by a user (e.g., via a payment card possessed by the user). Each indicated transaction may comprise a transaction identifier, an amount of the transaction, a date and/or time of the transaction, a merchant of the transaction, and/or other information associated with the transaction.

In step 407, the computing device may receive user flight data (e.g., the user flight data 305). The user flight data may be received from, for example, devices associated with airlines. Additionally or alternatively, the user flight data may be determined based on the received user transaction data, which may, for example, indicate a transaction where a user purchased a flight, and identify the user and his or her purchased flight. The user flight data may indicate, for example, a flight and one or more corresponding users who are passengers of the flight. For example, the user flight data may comprise one or more entries, and each entry may comprise an identifier of a flight and an identifier of a corresponding user who is a passenger of the flight.

In step 409, the computing device may determine a user for processing. The computing device may be configured to manage a plurality of users. For example, the computing device may be managed by an entity issuing payment cards. A plurality of users may use payment cards issued by the entity. The computing device may be configured to manage the configurations of the payment cards for the plurality of users. The computing device may, for example, sequentially select, from the plurality of users, a user for processing and/or determining metrics and/or intermediate data entries that may be used to determine adjustments to card configurations during a detected current flight interruption.

In step 411, the computing device may determine whether one or more past flight interruptions are indicated in the received data for the user as determined in step 409. For example, the computing device may determine what flights the user was a passenger of, and whether any of those flights had interruptions. If one or more past flight interruptions are indicated in the received data for the user (step 411: Y), the method may proceed to step 415. If one or more past flight interruptions are not indicated in the received data for the user (step 411: N), the method may proceed to step 413.

In step 415, the computing device may determine a past flight interruption (e.g., of the one or more past flight interruptions indicated in the received data for the user). For example, the computing device may be configured to sequentially select each of the one or more past flight interruptions indicated for the user. Each selected past flight interruption may be processed to generate a corresponding record, for the user, that may be used to determine adjustments to card configurations, as described in greater detail below.

In step 417, the computing device may determine factors of the past flight interruption as determined in step 415. The factors of the past flight interruption may comprise, for example, the date of the flight, the time of the flight, the departure location of the flight, the destination location of the flight, the duration and/or extent of the flight interruption (e.g., the amount of time the flight was delayed, whether the flight was canceled, etc.), the fare class (e.g., of the user's ticket to the flight), the underlying reason of the flight interruption, whether or to what extent the airline compensates for the flight interruption, and/or other factors.

In step 419, the computing device may determine transactions associated with the past flight interruption as determined in step 415. The transactions associated with the past flight interruption may comprise, for example, transactions conducted by the user as determined in step 409 (e.g., via one or more payments cards associated with the user) during the period of the past flight interruption. For example, if the user used his or her credit card to conduct a first transaction of buying a meal and a second transaction of reserving a hotel room during the duration of the past flight interruption, the two transactions may be determined to be associated with the past flight interruption, and may be used for determining card configuration adjustments for the credit card when the user experiences a current flight interruption.

In step 421, the computing device may determine an amount of spending and/or types of spending during the past flight interruption as determined in step 415. The determination may be based on the transactions, associated with the past flight interruption, as determined in step 419. For example, the amount of spending may correspond to the output of summing the amounts of the transactions associated with the past flight interruption. The types of spending may comprise, for example, a set of transaction types (e.g., one or more of dining, lodging, transportation, entertainment, shopping at duty-free stores, etc.) covering the transactions associated with the past flight interruption. Additionally or alternatively, the computing device may determine, based on the transactions associated with the past flight interruption, other metrics that may indicate aspects of the user's spending during the past flight interruption. For example, the computing device may determine an area where the transactions were conducted during the past flight interruption (e.g., as indicated by a radius from the airport, by zip code, and/or the like).

In step 423, the computing device may generate a record for the past flight interruption as determined in step 415. The record may identify the past flight interruption, and may comprise the past flight interruption factors as determined in step 417, the past flight interruption transactions as determined in step 419, and/or the amount of spending, types of spending, and/or other metrics as determined in step 421. The record may comprise additional or alternative information as desired by a person of ordinary skill in the art. More details regarding such generated record are described in connection with FIG. 8. The generated record may be used for determining card configuration adjustments during a detected current flight interruption. The generated record may be stored by the computing device (e.g., in a database).

In step 425, the computing device may determine whether relevant flight interruptions for the user have been processed. For example, the computing device may determine whether each of the one or more past flight interruptions indicated in the user data for the user (e.g., as discussed in connection with step 411) has been processed. If relevant flight interruptions for the user have been processed (step 425: Y), the method may proceed to step 427. If relevant flight interruptions for the user have not been processed (step 425: N), the method may repeat step 415. In step 415, the computing device may, for example, select, for processing and generating a record, a next one of the past flight interruptions associated with the user.

In step 427, the computing device may determine an overview amount of spending for the user as determined in step 409. The overview amount of spending may comprise, for example, an average amount of spending by the user during past flight interruptions. For example, as described above, one or more records may be generated for the user, wherein each record of the one or more records may identify a particular flight interruption that the user experienced, and may comprise information of that flight interruption, and/or user transactions associated with the flight interruption. Each record may indicate an amount of money that the user spent during the flight interruption as indicated in the record. The overview amount of spending may comprise an average of the amounts that the user spent across the flight interruptions that the user experienced. Additionally or alternatively, the computing device may determine a distribution of the amounts of spending by the user during past flight interruptions. The distribution may indicate a level of consistency in the user's spending following flight interruptions. For example, if the level of consistency in the user's spending following past flight interruptions satisfies a threshold level, the overview amount of spending for the user may be used for adjusting configurations of the card of the user during a detected current flight interruption. If the level of consistency in the user's spending following past flight interruptions does not satisfy a threshold level, the overview amount of spending for the user might not be used for adjusting configurations of the card of the user during a detected current flight interruption.

In step 429, the computing device may determine an overview set of transaction types for the user as determined in step 409. The overview set of transaction types for the user may be determined based on the one or more records generated for the user. In some examples, the overview set of transaction types may comprise the union of the sets, of transaction types, associated with the past flight interruptions that the user experienced. In some examples, the overview set of transaction types may comprise the intersection of the sets, of transaction types, associated with the past flight interruptions that the user experienced. A level of consistency (e.g., a Jaccard similarity coefficient) among the sets of transaction types may be determined. If the level of consistency satisfies a threshold, the overview set of transaction types may be used for adjusting configurations of the card of the user during a detected current flight interruption. If the level of consistency does not satisfy a threshold, the overview set of transaction types might not be used for adjusting configurations of the card of the user during a detected current flight interruption. Additionally or alternatively, other overview metrics for the user may be determined, such as an average radius or area of transaction locations following flight interruptions.

In step 413, the computing device may determine whether relevant users have been processed. As described above in connection with step 409, the computing device may be configured to manage a plurality of users. The computing device may, for example, determine whether each of the plurality of users has been processed (e.g., to generate one or more records based on user data). If relevant users have been processed (step 413: Y), the method may proceed to step 431 (FIG. 4B). If relevant users have not been processed (step 413: N), the method may repeat step 409. In step 409, the computing device may, for example, select, for processing, a next user from the plurality of users managed by the computing device.

In step 431 (FIG. 4B), the computing device may configure a default amount of available credit for flight interruptions. The default amount may be used to adjust configurations of a user's payment cards, for example, if customized adjustments are not confidently determined based on the user's available historical data. The default amount may be set, for example, by an administrator based on various considerations, such as by assessing credit risks. The default amount may be configured in connection with processing of user data or at another time as desired by a person of ordinary skill in the art. In some examples, the default amount may comprise a numeric money value (e.g., $1,000). The default amount may be a common value for users. In some examples, the default amount may be represented by a default percentage (e.g., 20%), and may correspond to the default percentage multiplied by the particular user's current credit limit (e.g., the default amount for a user may be $1,000, corresponding to the default percentage 20% multiplied by the user's current credit limit $5,000). The default amount may be specific to the user.

In some examples, the default amount may be determined based on various factors as described herein associated with flight interruptions, such as the date of the flight, the time of the flight, the departure location of the flight, the destination location of the flight, the duration and/or extent of the flight interruption (e.g., the amount of time the flight was delayed, whether the flight was canceled, etc.), the fare class (e.g., of the user's ticket to the flight), the underlying reason of the flight interruption, whether or to what extent the airline compensates for the flight interruption, and/or other factors. For example, for flight interruptions that begin in the morning and last for less than one (1) hour, a default amount may be a lower value (e.g., $100) or represented by a lower percentage of a user's current credit limit. And for flight interruptions that begin in the evening and last for more than eight (8) hours, a default amount may be a higher value (e.g., $800) or represented by a higher percentage of a user's current credit limit. For example, the default amount may be different for flight interruptions with different departure locations. For example, the default amount for flight interruptions during holidays or weekends may be different from the default amount for flight interruptions during other days.

In step 433, the computing device may configure a default set of transaction types for flight interruptions. The default set may be used to adjust configurations of a user's payment cards, for example, if customized adjustments are not confidently determined based on the user's available historical data. The default set may be configured, for example, by an administrator based on various considerations, such as by assessing credit risks. The default set may be configured in connection with processing of user data or at another time as desired by a person of ordinary skill in the art. The default set may comprise one or more of a plurality of transaction types, such as dining, lodging, transportation, shopping, entertainment, and/or the like. The default set may be, for example, a common set for users. In some examples, the default set may comprise transaction types that may be considered to be needed during the flight interruption, such as dining, lodging, etc., and the default set might not include transaction types that may be considered to be optional during the flight interruption, such as shopping, etc.

In some examples, the default set may be determined based on various factors as described herein associated with flight interruptions, such as the date of the flight, the time of the flight, the departure location of the flight, the destination location of the flight, the duration and/or extent of the flight interruption (e.g., the amount of time the flight was delayed, whether the flight was canceled, etc.), the fare class (e.g., of the user's ticket to the flight), the underlying reason of the flight interruption, whether or to what extent the airline compensates for the flight interruption, and/or other factors. For example, for flight interruptions that begin in the morning and last for less than one (1) hour, a default set may comprise a lower number of transaction types (e.g., dining). And for flight interruptions that begin in the evening and last for more than eight (8) hours, a default set may comprise a higher number of transaction types (e.g., dining, lodging, and entertainment). For example, the default set may be different for flight interruptions with different departure locations. For example, the default set for flight interruptions during holidays or weekends may be different from the default set for flight interruptions during other days.

Additionally or alternatively, the computing device may configure other default metrics that may be used to adjust configurations of a user's payment cards, for example, if customized adjustments are not confidently determined based on the user's available historical data. For example, the computing device may configure a default radius or area of transaction locations following flight interruptions. If the default radius or area is used to adjust configurations of a card, transactions via the card with merchants outside the default radius from the departure airport or outside the default area of the departure airport might not be authorized. In some examples, the default metrics may be determined based on various factors as described herein associated with flight interruptions, such as the date of the flight, the time of the flight, the departure location of the flight, the destination location of the flight, the duration and/or extent of the flight interruption (e.g., the amount of time the flight was delayed, whether the flight was canceled, etc.), the fare class (e.g., of the user's ticket to the flight), the underlying reason of the flight interruption, whether or to what extent the airline compensates for the flight interruption, and/or other factors. In some examples, default metrics and/or other metrics as described herein that may be used to adjust card configurations for flight interruptions may be determined based on business rules or business logic (e.g., based on assessing credit risk). For example, based on received business rules or business logic, the computing device may determine that the default amount of available credit may comprise a larger or smaller amount, and/or that the default set of transaction types may comprise a larger or smaller number of transaction types.

In step 435, the computing device may determine whether monitoring of current flight interruptions is activated. For example, the function to monitor current flight interruptions for users may be set active or inactive by an administrator. Additionally or alternatively, the function to monitor current flight interruptions may be activated or made inactive by users. For example, the computing device may allow a user to activate or make inactive a function to monitor current flight interruptions for that user. If monitoring of current flight interruptions is activated (step 435: Y), the method may proceed to step 437. If monitoring of current flight interruptions is not activated (step 435: N), the method may repeat step 401 (FIG. 4A).

In step 437, the computing device may receive current flight status data (e.g., the current flight status data 313). The current flight status data may be received from, for example, devices associated with airlines. The current flight status data may indicate, for example, whether each of one or more flights is currently in a status of being interrupted (e.g., delayed, canceled, etc.). The current flight status data may be received in real-time (e.g., from devices associated with airlines). In some examples, the current flight status data may indicate that the status of a flight is changing to being interrupted. The current flight status data may indicate, for example, one or more instances of current flight interruptions. For each indicated current flight interruption, the current flight status data may also comprise the flight identifier (e.g., airline name and flight number), the date and/or time of the flight, the departure location of the flight, the destination location of the flight, the extent of the interruption, and/or other information associated with the flight interruption.

In step 439, the computing device may receive user flight data (e.g., the user flight data 315). The user flight data may be received from, for example, devices associated with airlines. Additionally or alternatively, the user flight data may be determined based on the received user transaction data (as discussed in connection with step 405), which may, for example, indicate a transaction where a user purchased a flight, and identify the user and his or her purchased flight. The user flight data may indicate, for example, a flight and one or more corresponding users who are passengers of the flight. For example, the user flight data may comprise one or more entries, and each entry may comprise an identifier of a flight and an identifier of a corresponding user who is a passenger of the flight.

In step 441, the computing device may determine whether a current flight interruption is detected for a user. For example, the computing device may detect, based on the received current flight status data and the received user flight data, current flight interruptions for users. The computing device may determine whether any one of the users is a passenger of a flight whose status is changing to being interrupted (e.g., from being on schedule). Based on data received in real-time, the computing device may determine, for each of the users, whether there is a current flight interruption that the user is experiencing. The change of a flight status from being on schedule to being interrupted may trigger the detection of a current flight interruption.

The computing device may perform processes (e.g., one or more of the steps following the Y branch of step 441 in FIG. 4B and the steps in FIG. 4C) for adjusting card configurations for the user during the detected current flight interruption, as described in greater detail below. The computing device may perform such processes for each instance of detecting a current flight interruption for a user (e.g., each instance where a user's flight status is changing from being on schedule to being interrupted). In some examples, flight interruption(s) affecting multiple users may be detected, and the computing device may be configured to perform such processes for each of the affected users. If a current flight interruption is detected for a user (step 441: Y), the method may proceed to step 443. If a current flight interruption is not detected for a user (step 441: N), the method may repeat step 401.

In step 443, the computing device may determine flight information associated with the current flight interruption as detected in step 441. The flight information may comprise, for example, an identifier of the flight having the detected current interruption, the date of the flight, the time of the flight, the departure location of the flight, the destination location of the flight, the duration and/or extent of the flight interruption (e.g., the amount of time the flight is to be delayed, whether the flight is canceled, etc.), the fare class (e.g., of the user's ticket to the flight), the underlying reason of the flight interruption, whether or to what extent the airline compensates for the flight interruption, and/or other information. The flight information may be, for example, indicated in the current flight status data. In some examples, the flight information may be received from a device storing such information (e.g., a device managed by an airline). In some examples, the flight information may be determined based on user transaction data (e.g., the user transaction data may include flight information, which may be identified by an identifier of the flight).

In step 445, the computing device may determine user information. The user information may comprise, for example, an identifier (e.g., name) of the user who is experiencing the detected current flight interruption. In step 447, the computing device may determine whether historical data is available for the user. The computing device may, for example, determine whether one or more records for the user (e.g., as described in connection with step 423) indicating historical data have been generated and/or stored. The computing device may additionally or alternatively search for any historical data for the user in a database storing flight interruption data, user transaction data, user flight data, and/or other data. If historical data is available for the user (step 447: Y), the method may proceed to step 449. If historical data is not available for the user (step 447: N), the method may proceed to step 457.

In step 449, the computing device may generate a prediction based on historical data. For example, one or more records generated for the user (e.g., as described in connection with step 423) may be retrieved by the computing device. The computing device may select, from the one or more records, at least one record indicating a past flight interruption that is approximate to the detected current flight interruption. The selection may be based on comparing the flight information of the current flight interruption as determined in step 443 with the corresponding information of the past flight interruption. A degree of similarity may be determined between the current flight interruption and the past flight interruption. The degree of similarity may comprise, for example, a weighted sum of similarity levels, wherein each similarity level may be between a factor (e.g., flight interruption duration, departure location, time of day, etc.) of the current flight interruption and the factor of the past flight interruption. The computing device may select, from the one or more records generated for the user, a record or a set of records indicating past flight interruption(s) more similar to the current flight interruption. The past flight interruption(s) indicated in the selected record or set of records may be more similar to the current flight interruption than the past flight interruption(s) indicated in non-selected record(s) may be similar to the current flight interruption.

The computing device may generate a prediction based on the selected record(s). The prediction may comprise a predicted amount of available credit, and/or a predicted set of transaction types. The predicted amount of available credit may correspond to the amount of spending by the user during the selected past flight interruption. The predicted set of transaction types may comprise the transaction types that the user conducted during the selected past flight interruption. If multiple past flight interruptions are selected, the predicted amount of available credit may correspond to an average of the amounts of spending by the user during the selected past flight interruptions. If multiple past flight interruptions are selected, the predicted set of transaction types may comprise, for example, a union or intersection of transaction type sets, wherein each of the transaction type sets comprises transaction types that the user conducted during one of the selected past flight interruptions. In some examples, if multiple records (and/or past flight interruptions) that are selected indicate a consistent pattern of spending by the user in a category (e.g., shopping at duty-free stores) during the past flight interruptions, the category may be included in the predicted set of transaction types, so that transactions by the user in the category may be allowed during the current flight interruption. Additionally or alternatively, the prediction may comprise other predicted metrics, such as a predicted radius or area of transaction locations.

In step 451, the computing device may determine a confidence score for the prediction. The confidence score may be based on, for example, the degree of similarity between the current flight interruption and the selected past flight interruption(s). For example, if the current flight interruption begins at 9:00 am and lasts or is expected to last for one (1) hour, and the selected past flight interruption began at 8:30 am and lasted for two (2) hours, the degree of similarity between the current flight interruption and the past flight interruption may be high, and the confidence score for a prediction based on the selected past flight interruption may be high. And if the current flight interruption begins at 9:00 pm and lasts or is expected to last for twelve (12) hours, and the selected past flight interruption began at 8:30 am and lasted for two (2) hours, the degree of similarity between the current flight interruption and the past flight interruption may be low, and the confidence score for a prediction based on the selected past flight interruption may be low.

In step 453, the computing device may determine whether the confidence score for the prediction satisfies a threshold. The threshold may be, for example, set by an administrator. The prediction based on selected past flight interruption(s) may have a confidence score that satisfies the threshold, if the detected current flight interruption is substantially similar to the selected past flight interruption(s). If the confidence score for the prediction satisfies the threshold (step 453: Y), the method may proceed to step 455. If the confidence score for the prediction does not satisfy the threshold (step 453: N), the method may proceed to step 457.

Additionally or alternatively, the computing device may generate multiple predictions for the user, may determine multiple corresponding confidence scores for the predictions, may select, from the multiple predictions, a prediction with a higher confidence score than the other predictions, and may determine whether the confidence score of the selected prediction satisfies the threshold (as discussed in connection with step 453). The multiple predictions may include, for example, the prediction based on selected past flight interruption(s) similar to the current flight interruption, as discussed above. The multiple predictions may additionally or alternatively include the overview metrics for the user as discussed in connection with steps 427, 429. The confidence score for the overview metrics may be based on the level(s) of consistency among the patterns of the user's spending during past flight interruptions, as discussed in connection with steps 427, 429.

Additionally or alternatively, the generating of a prediction for the user and/or the determining of a confidence score for the prediction may be performed via one or more machine learning algorithms. For example, a decision tree may be used to perform the generating and/or the determining. Additionally or alternatively, a neural network may be used to perform the generating and/or the determining. The input nodes of the neural network may correspond to factors of a flight interruption, such as the date of the flight, the time of the flight, the departure location of the flight, the destination location of the flight, the duration and/or extent of the flight interruption (e.g., the amount of time the flight is delayed, whether the flight is canceled, etc.), the fare class (e.g., of the user's ticket to the flight), the underlying reason of the flight interruption, whether or to what extent the airline compensates for the flight interruption, and/or other factors. The output nodes of the neural network may correspond to an amount of spending by a user during the flight interruption, a set of transaction types by the user during the flight interruption, and/or other metrics. A confidence score for the output predictions may be determined based on the neural network. The neural network may be trained based on past flight interruptions and user transactions associated with the past flight interruptions (e.g., via supervised learning). The generating of a prediction for the user and/or the determining of a confidence score for the prediction may be performed via other types of machine learning algorithms. For example, the machine learning algorithms used may comprise a machine classifier, an artificial neural network, a decision tree, a support vector machine, a logistic regression model, a linear discriminant analysis model, a k-nearest neighbors model, a naive Bayes model, and/or the like. The machine learning algorithms may be configured to classify (e.g., current and/or past) flight interruptions into different categories (e.g., morning flight or evening flight, delay with a short duration or delay with a long duration, etc.). The machine learning algorithms may be configured to classify the current flight interruption associated with the user into a category of the different categories, may determine past flight interruptions, associated with the user, that may be classified into that category, and may use the determined past flight interruptions to generate a prediction for the user as discussed herein. Factors of flight interruptions may be input to the machine learning algorithms. The machine learning algorithms may be trained, for example, based on past flight interruptions (e.g., which may be manually labeled with different categories) using supervised learning. It should be readily apparent to a person having ordinary skill in the art that a variety of machine learning algorithms may be utilized including (but not limited to) machine classifiers, decision trees, k-nearest neighbors, support vector machines (SVM), neural networks (NN), recurrent neural networks (RNN), convolutional neural networks (CNN), probabilistic neural networks (PNN), and transformer-based architectures. RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In one or more examples, a combination of machine learning algorithms may be utilized. In one or more examples, different types of machine learning algorithms may be utilized to help increase accuracy of predictions.

In step 455, the computing device may use the prediction for updating card configurations of the user's card(s) during the detected current flight interruption, the prediction having a confidence score that satisfies the threshold.

In step 457, the computing device may determine default metrics for updating card configurations of the user's card(s) during the detected current flight interruption. The default metrics may be determined as discussed in connection with steps 431, 433. The default metrics may comprise, for example, a default amount of available credit, and/or a default set of transaction types. Additionally or alternatively, the default metrics may comprise a default radius or area of transaction locations, and/or other metrics. In some examples, the default metrics may comprise metrics that are same for various users and/or are independent of the factors of the current flight interruption. In some examples, the default metrics may comprise metrics that may be determined based on the factors of the current flight interruption, as discussed in connection with steps 431, 433. Additionally or alternatively, if historical data is not available for a user, or if a prediction based on available historical data for the user does not have a confidence score that satisfies the threshold, the computing device may determine, based on available historical data associated with users who are similar to the user by a threshold extent, and/or based on available historical data associated with users other than the user indicating past flight interruptions that are similar to the detected current flight interruption, metrics for updating card configurations of the user's card(s) during the detected current flight interruption.

In step 461 (FIG. 4C), the computing device may determine an amount of currently available credit for the user. The amount of currently available credit may be of the user's payment card (e.g., a credit card or a virtual card). In some examples, the amount of currently available credit may be of multiple payment cards possessed by the user. Card configurations of the one or more cards possessed by the user may be updated during the detected current flight interruption. In some examples, the card configurations of the one or more cards may be updated during the current flight interruption based on transactions conducted via the one or more cards during past flight interruptions. In some examples, the card configurations of the one or more cards may be updated during the current flight interruption based on transactions conducted via one or more other cards during past flight interruptions.

In step 463, the computing device may determine whether the amount of currently available credit satisfies a threshold. The threshold may correspond to the predicted amount of available credit as discussed in step 455, or the default amount of available credit as discussed in step 457, as the case may be. In some examples, the threshold may correspond to a metric determined in another manner for facilitating sufficient available credit for the user during the detected current flight interruption. If the amount of currently available credit satisfies the threshold (step 463: Y), the method may proceed to step 465. In step 465, the computing device may keep the credit limit of the one or more cards possessed by the user. The credit limit and/or the amount of currently available credit might not be adjusted.

If the amount of currently available credit does not satisfy the threshold (step 463: N), the method may proceed to step 467. In step 467, the computing device may increase the credit limit of the one or more cards possessed by the user. The credit limit may be increased by such extent that the amount of currently available credit of the one or more cards possessed by the user may correspond to the threshold amount. In step 469, the computing device may send a notification to the user. The notification may indicate that the credit limit of the user's card(s) has been increased for the period of the current flight interruption. The notification may indicate the amount increased. The notification may indicate the amount of currently available credit for the user (e.g., corresponding to the threshold amount). The notification may indicate that the increase of the credit limit may be reset when the current flight interruption period ends. The notification may be sent to a device (e.g., smart phone, cell phone, laptop, virtual reality headset, smart watch, etc.) of the user. The notification may be sent via any type of communication channel as desired by a person of ordinary skill in the art, such as email, text message, push notification, phone call, application programming interface (API), etc.

In step 471, the computing device may configure an area of authorized transactions for the user's card(s). The area of authorized transactions may comprise an area such that transactions conducted outside the area and/or transactions conducted with merchants outside the area might not be authorized during the current flight interruption. For example, the area of authorized transactions may comprise the premises of the departure airport associated with the current flight interruption. In some examples, the area of authorized transactions may also comprise the peripheral areas of the departure airport associated with the current flight interruption, the peripheral areas including hotels, restaurants, and/or the like. Additionally or alternatively, the area of authorized transactions may comprise one of the predicted radius or area of transaction locations as discussed above in connection with step 449 (or the average radius or area of transaction locations as discussed above in connection with steps 427, 429), or the default radius or area of transaction locations as discussed above in connection with steps 431, 433, as the case may be (e.g., as discussed in steps 455, 457). The area of authorized transactions may be determined based on various factors of the current flight interruption, and/or historical user data. For example, if the current flight interruption lasts or is expected to last for one (1) hour, the area of authorized transactions may be the premises of the departure airport. If the current flight interruption lasts or is expected to last for twelve (12) hours, the area of authorized transactions may be the premises of the departure airport and the peripheral areas of the departure airport. If the user historically had a certain radius of travel from the departure airport during past flight interruptions similar to the current flight interruption, the area of authorized transactions may correspond to the historical radius of travel. In some examples, the area of authorized transactions may be effective for transactions based on the increased amount of credit of the user's card(s). In some examples, the area of authorized transactions may be effective for all transactions via the user's card(s) during the period of flight interruption.

In step 473, the computing device may determine a set of authorized transaction types for the user's card(s). The set of authorized transaction types may be of the user's payment card(s), and may be based on fraud rules associated with the user's payment card(s). The set of authorized transaction types may comprise one or more transaction types that are currently authorized to be conducted via the user's card(s).

In step 475, the computing device may determine whether the set of authorized transaction types covers expected transaction types. The expected transaction types may comprise the predicted set of transaction types as discussed in step 455, or the default set of transaction types as discussed in step 457, as the case may be. If the set of authorized transaction types covers the expected transaction types (step 475: Y), the method may proceed to step 477. In step 477, the computing device may keep the set of authorized transaction types. The set of authorized transaction types might not be changed during the current flight interruption. If the set of authorized transaction types does not cover the expected transaction types (step 475: N), the method may proceed to step 479. In step 479, the computing device may supplement the set of authorized transaction types. For example, the computing device may determine which transaction type(s) of the expected transaction types are not covered by the set of authorized transaction types, and may add those determined transaction type(s) to the set of authorized transaction types. After the supplementing, the set of authorized transaction types may correspond to the expected transaction types. In some examples, the user might not be notified of the updates related to the fraud rules associated with the user's card(s), such as the updates to the set of authorized transaction types and/or the area of authorized transactions for the card(s). In some examples, the user may be notified of the updates related to the fraud rules associated with the user's card(s).

The adjustment of card configurations of the user's card(s) (e.g., adjustments to the credit limit, the area of authorized transactions, and/or the set of authorized transaction types) may be completed in real-time (e.g., shortly after the detecting of the current flight interruption for the user), to facilitate better user experience.

In step 481, the computing device may determine a duration of the current flight interruption. The duration may be an expected duration of the current flight interruption (e.g., based on the underlying reasons of the current flight interruption). The expected duration may be updated in real-time. For example, if the flight is delayed, the airline may send, to the computing device, updates regarding the delay. New departure time(s) for the flight may be set, and may be sent to the computing device. The computing device may determine the duration of the current flight interruption, for example, based on the updates. In some examples, the current flight may be canceled, and a new ticket for another flight may be purchased by the user. The departure time of the other flight may be sent to the computing device, and may be used to determine the duration of the current flight interruption.

In step 483, the computing device may cause reset of card configurations for the user's card(s) based on expiration of the duration of the current flight interruption. For example, the computing device may set a timer corresponding to the duration of the current flight interruption and, when that timer expires, the computing device may reset the card configurations for the user's card(s). The card configurations for the user's card(s) (e.g., the credit limit, the area of authorized transactions, and/or the set of authorized transaction types) may be reset back to the version prior to being updated for the detected flight interruption. In some examples, a task for resetting the card configurations of the user's card(s) may be created, and the task may be configured to monitor whether the duration of the current flight interruption has expired, and to reset the card configurations of the user's card(s) based on determining that the duration of the current flight interruption has expired.

In step 485, the computing device may store user transaction data associated with the current flight interruption. The user may perform one or more transactions via his or her card(s) during the current flight interruption, and that transaction data may be stored by the computing device. The transaction data may be stored in a database of the computing device (e.g., the database 307). In step 487, the computing device may trigger update of user data. For example, after the current flight interruption duration, the computing device may receive data of the flight interruption and/or data of transactions (e.g., conducted by the user) during the flight interruption. The receiving of the new data associated with the flight interruption may trigger updating of various metrics that may be determined based on data associated with flight interruptions, as described herein. For example, the computing device may, based on receiving the new data, activate the processing of user data as described in connection with step 401, and may update, based on the new data, various metrics as described herein. For example, based on the new data associated with this flight interruption, the computing device may generate a record for the flight interruption for the user as described in connection with step 423, and/or may update the overview metrics for the user as described in connection with steps 427, 429.

FIG. 5 shows an example of flight interruption data 500 in accordance with one or more aspects described herein. The data structure as shown for the data is shown as an example, and other types of data structures may be used for the data as desired by a person of ordinary skill in the art. The flight interruption data 500 may indicate one or more flight interruptions and information of each flight interruption. For example, the flight interruption data 500 may comprise one or more entries (e.g., entries 551, 553, 555). Each entry of the entries 551, 553, 555 may indicate a particular flight interruption, and information of the flight interruption, such as an identifier of the flight being interrupted, a date and/or time of the flight, a departure location of the flight, a destination location of the flight, an extent of the flight interruption, and/or other information. For example, entry 553 may indicate that flight EFGHI 234 had an interruption, that the date and/or time of the flight is May 7, 2019 at 19:30, that the departure location of the flight is LAS (McCarran International Airport), that the destination location of the flight is JFK (John F. Kennedy International Airport), and that the extent of the flight interruption is being delayed twelve (12) hours. The entry may indicate additional information as desired by a person of ordinary skill in the art.

FIG. 6 shows an example of user transaction data 600 in accordance with one or more aspects described herein. The data structure as shown for the data is shown as an example, and other types of data structures may be used for the data as desired by a person of ordinary skill in the art. The user transaction data 600 may indicate one or more transactions conducted via a user's payment card(s), and information of each transaction. The example of the user transaction data 600 may indicate transactions associated with UserA (e.g., transactions conducted via UserA's credit card(s) and/or virtual card(s)), but the user transaction data 600 may include transactions associated with any user. The user transaction data 600 may comprise one or more entries (e.g., entries 651, 653, 655, 657, 659). Each entry of the entries 651, 653, 655, 657, 659 may indicate a particular transaction conducted via UserA's payment card(s), and information of the transaction, such as an identifier (and/or description) of the transaction, an amount of the transaction, a data and/or time of the transaction, a merchant of the transaction, and/or other information. For example, entry 651 may indicate that the identifier (and/or description) of a transaction conducted via UserA's payment card(s) is "purchasing EFGHI flight ticket SJFOIWJV_43298," that the amount of the transaction is $425.15, that the date and/or time of the transaction is May 5, 2019 at 21:30, that the merchant of the transaction is EFGHI, and that other information of the transaction is "booked EFGHI_234_5/7/2019_19:30." The other information may indicate more details about the corresponding transaction. The other information in entry 651 may indicate that the user booked a flight that may be identified to be EFGHI 234 scheduled for May 7, 2019 at 19:30. The other information (e.g., in entry 651) may be used to, for example, determine a mapping between flights and users as passengers of the flights, such as user flight data as described herein.

FIG. 7 shows an example of user flight data 700 in accordance with one or more aspects described herein. The data structure as shown for the data is shown as an example, and other types of data structures may be used for the data as desired by a person of ordinary skill in the art. The user flight data 700 may indicate a mapping between a flight and user(s) who are passenger(s) of the flight. The user flight data 700 may comprise one or more entries (e.g., entries 751, 753, 755, 757). Each entry of the entries 751, 753, 755, 757 may indicate a mapping between a flight and a user who is a passenger of the flight, and/or may comprise identifying information of the flight and identifying information of the user. For example, entry 755 may indicate that UserA is a passenger of flight EFGHI 234 scheduled for May 7, 2019 at 19:30.

FIG. 8 shows an example of records 800 for a user in accordance with one or more aspects described herein. The data structure as shown for the data is shown as an example, and other types of data structures may be used for the data as desired by a person of ordinary skill in the art. The records 800 may indicate one or more records generated for a user (e.g., as described in connection with step 423 (FIG. 4A)). The records 800 may indicate one or more past flight interruptions associated with the user and data associated with each past flight interruption, and may be used to determine adjustments to card configurations of the user's payment card(s) for a detected current flight interruption that the user is experiencing as described herein. The example of the records 800 may indicate records associated with UserA (e.g., records generated for UserA), but the records 800 may indicate records associated with any user. The records 800 may comprise one or more records (e.g., record 851). The record 851 may indicate a past flight interruption that UserA experienced, information of the past flight interruption, transactions conducted via UserA's payment card(s) during the past flight interruption, an amount of spending and/or types of spending during the past flight interruption, and/or other information.

For example, the record 851 may indicate that a past flight interruption to flight EFGHI 234 scheduled for May 7, 2019 at 19:30 was experienced by UserA (who was a passenger of the flight). The record 851 may indicate that information of the past flight interruption is "Departure LAS; Destination JFK; Extent of interruption Delayed 12 hours," which may indicate that the departure location of the flight is LAS, that the destination location of the flight is JFK, and that the extent of the past flight interruption is being delayed 12 hours. The record 851 may indicate that transactions associated with the past flight interruption correspond to entries 655, 657 (FIG. 6), as the transactions indicated in those entries were conducted via UserA's payment card(s) during the 12-hour delay period of the flight interruption. The record 851 may indicate that the amount of spending and/or types of spending during the past flight interruption is "Total amount: $279.15; Types: dining, lodging," which may indicate that the total amount of spending by UserA during the past flight interruption is $279.15 (corresponding to the sum of the amounts of the transactions associated with the past flight interruption), and that the types of spending by UserA during the past flight interruption are dining and lodging (based on the user's dining at Good pizza and the user's lodging at Traveler's lodge as indicated in the transactions associated with the past flight interruption).

Figure 9:
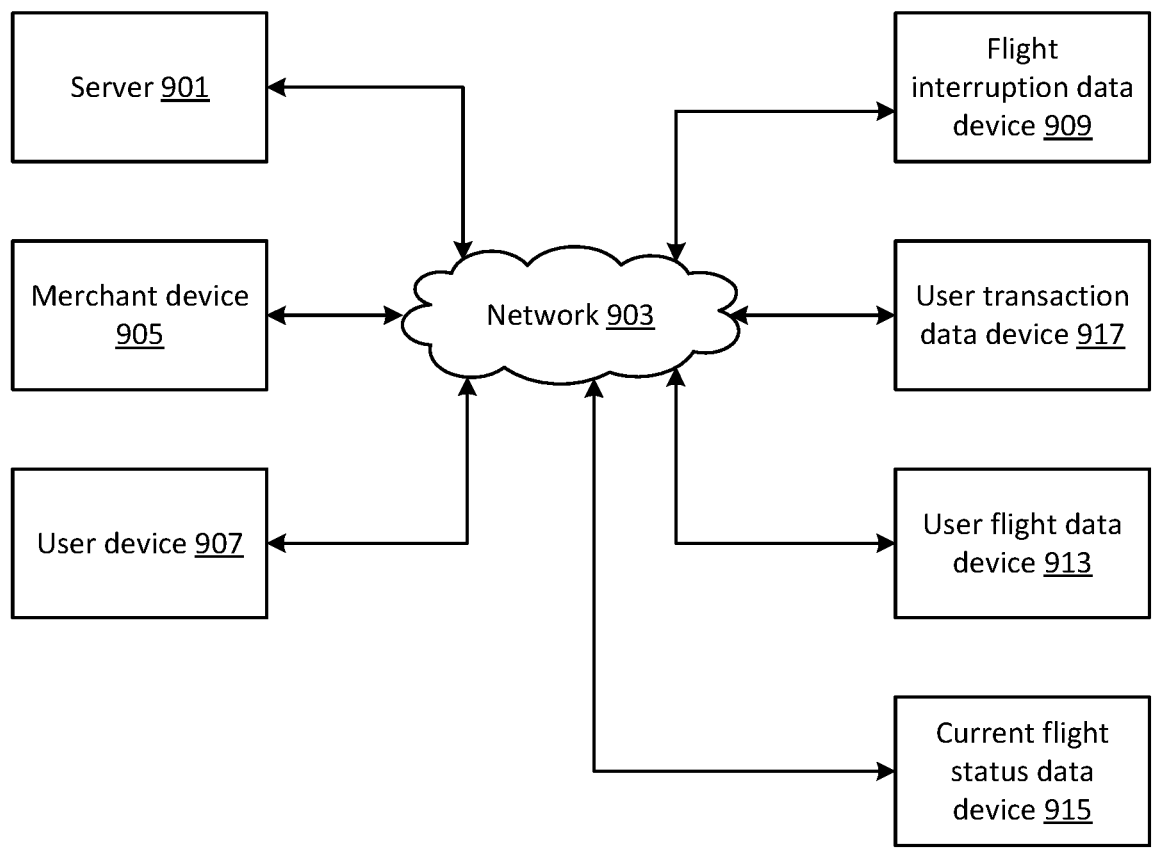
FIG. 9 is a schematic diagram showing an example system for adjusting card configurations in which various aspects described herein may be implemented.

FIG. 9 is a schematic diagram showing an example system for adjusting card configurations in which various aspects described herein may be implemented. The system may comprise an operating environment in which one or more aspects described herein may be implemented. The system may comprise one or more servers (e.g., server 901), one or more networks (e.g., network 903), one or more merchant devices (e.g., merchant device 905), one or more user devices (e.g., user device 907), and/or one or more data source devices (e.g., flight interruption data device 909, user transaction data device 917, user flight data device 913, current flight status data device 915). It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The server 901 may comprise any type of computing device. From a physical standpoint, the server 901 may be implemented as a single device (such as a single server) or as a plurality of devices (such as a plurality of distributed servers). The server 901 may adjust card configurations for flight interruptions as described herein. The server 901 may comprise and/or be implemented with one or more components in a similar manner as the computing device 200.

The network 903 may comprise a single network or a collection of multiple connected networks. The network 903 may comprise one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The network 903 may comprise a local area network (LAN), a wide area network (WAN), a backbone network, etc. The network 903 may comprise an Internet Protocol (IP) based network (e.g., the Internet). The network 903 may comprise a plurality of interconnected communication links (e.g., to connect the server 901, the merchant device 905, the user device 907, the flight interruption data device 909, the user transaction data device 917, the user flight data device 913, the current flight status data device 915, and/or other devices).

The merchant device 905 may comprise any type of computing device. The merchant device 905 may comprise, for example, a payment terminal, a point of sale (POS) terminal, a credit card terminal, a card reader, a credit card reader, a virtual card reader, a contactless smart card reader, and/or the like. The merchant device 905 may be, for example, possessed by a merchant. The merchant device 905 may be configured to capture information of payment cards possessed by users, and/or to facilitate transactions to be conducted via the payment cards between merchants and users. The merchant device 905 may be in communication with the server 901 to facilitate the transactions. For example, the merchant device 905 may request, from the server 901, authorization of a transaction via a payment card based on the payment card's configurations determined by the server 901. The server 901 (and/or any other associated computing device) may be configured to process (e.g., to authorize), based on payment card configurations (e.g., as determined or adjusted for flight interruptions), transactions from the merchant device 905. The merchant device 905 may comprise and/or be implemented with one or more components in a similar manner as the computing device 200.

The user device 907 may comprise any type of computing device. The user device 907 may comprise, for example, a smartphone, a cell phone, a mobile communication device, a personal computer, a server, a tablet, a desktop computer, a laptop computer, a gaming device, a virtual reality headset, or any other type of computing device. The user device 907 may be, for example, possessed by a user. In some examples, the user device 907 may store one or more virtual cards for conducting transactions (e.g., to make a purchase of goods). The user device 907 may be configured to receive information via the network 903, such as notifications, from the server 901, of updating of card configuration(s) of the user's payment card(s). The user device 907 may comprise and/or be implemented with one or more components in a similar manner as the computing device 200.

The one or more data source devices (e.g., the flight interruption data device 909, the user transaction data device 917, the user flight data device 913, and/or the current flight status data device 915) may comprise any type of computing device. The one or more data source devices may be configured to function as source(s) of various types of data, and to provide data to other devices. For example, data that may be stored and/or provided by the flight interruption data device 909 may comprise, for example, flight interruption data (e.g., the flight interruption data 301) and/or the like. For example, data that may be stored and/or provided by the user transaction data device 917 may comprise, for example, user transaction data (e.g., the user transaction data 303) and/or the like. For example, data that may be stored and/or provided by the user flight data device 913 may comprise, for example, user flight data (e.g., the user flight data 305, 315) and/or the like. For example, data that may be stored and/or provided by the current flight status data device 915 may comprise, for example, current flight status data (e.g., the current flight status data 313) and/or the like. The one or more data source devices may be configured to, for example, provide data to the server 901. The one or more data source devices may exchange data with the server 901, provide training data to the server 901, provide input data to the server 901 for classification, and/or obtain data from the server 901 (e.g., data of transactions conducted via the merchant device 905 and/or processed by the server 901), as described herein. In some examples, the one or more data source devices may be combined, and/or additional data source device(s) may be provided. In some examples, the one or more data source devices may communicate with each other, to receive data from each other, and/or to process received data to produce processed data, as described herein. In some examples, the one or more data source devices may be associated with (e.g., managed by) one or more entities. Each of the one or more data source devices may comprise and/or be implemented with one or more components in a similar manner as the computing device 200.

It should be noted that any computing device in the operating environment as shown in FIG. 9 may perform any of the processes and/or store any data as described herein. The devices (e.g., the one or more data source devices and/or the server 901) may be publicly accessible and/or have restricted access. Access to a particular system may be limited to particular devices. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 903 may include a local area network (LAN), a wide area network (WAN), a wireless telecommunications network, and/or any other communication network or combination thereof.

The data transferred to and from various computing devices in the operating environment as shown in FIG. 9 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In some examples, one or more web services may be implemented within the various computing devices. Web services may be accessed by authorized external devices and users to support input, extraction, and manipulation of data between the various computing devices in the operating environment. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption.

Specialized hardware may be used to provide secure web services. Secure network appliances may include built-in features such as hardware-accelerated SSL and HTTPS, WS-Security, and/or firewalls. Such specialized hardware may be installed and configured in the operating environment shown in FIG. 9 in front of one or more computing devices such that any external devices may communicate directly with the specialized hardware.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although examples are described above, features and/or steps of those examples may be combined, divided, omitted, rearranged, revised, and/or augmented in any desired manner. For example, any of the various processes described above may be performed in alternative sequences and/or in parallel (e.g., on different computing devices). Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. Accordingly, the scope of the invention should be determined not by the embodiments illustrated, but by the appended claims and their equivalents.

What is claimed is:

1. A method comprising:
   receiving, by a computing device, past flight interruption data indicating a plurality of past flight interruptions;
   receiving user transaction data indicating card transactions, which were performed during past flight interruptions, associated with a plurality of users;
   training, by the computing device and based on the past flight interruption data and the user transaction data, a machine learning model to predict user spending configurations to be applied, during flight interruptions, to a card associated with a user, wherein the trained machine learning model is configured to generate a predicted user spending configuration based on input historical records for the user;

determining, by the computing device and based on the flight interruption data and the user transaction data, one or more historical records for the user of the plurality of users, wherein each record of the one or more historical records for the user indicates a past flight interruption and one or more performed card transactions associated with the past flight interruption, wherein the one or more performed card transactions were performed via the card associated with the user;

detecting a current flight interruption associated with the user;

determining, using the machine learning model and based on the detected current flight interruption and the one or more historical records for the user, one or more predicted user spending configurations to be applied during the current flight interruption to the card associated with the user; and updating, based on the one or more predicted user spending configurations, one or more user spending configurations of the card associated with the user.

2. The method of claim 1, wherein the determining the one or more historical records for the user is further based on data indicating a mapping of a past flight interruption to one or more affected users.

3. The method of claim 1, wherein the card associated with the user comprises a credit card or a virtual card.

4. The method of claim 1, wherein the one or more predicted user spending configurations comprise one or more of a predicted amount of available credit or a predicted set of transaction types.

5. The method of claim 1, wherein the determining, using the machine learning model and based on the detected current flight interruption and the one or more historical records for the user, the one or more predicted user spending configurations comprises:

selecting, based on the current flight interruption and from the one or more historical records for the user, at least one record; and determining, based on the at least one record, the one or more predicted user spending configurations.

6. The method of claim 1, wherein the determining, using the machine learning model and based on the detected current flight interruption and the one or more historical records for the user, the one or more predicted user spending configurations is further based on one or more of a date of the current flight interruption, a time of the current flight interruption, a departure location associated with the current flight interruption, or a destination location associated with the current flight interruption.

7. The method of claim 1, further comprising:

sending after the updating, by the computing device and to a user device associated with the user, a notification that the one or more user spending configurations of the card has been updated.

8. The method of claim 1, further comprising:

determining, by the computing device and based on the flight interruption data and the user transaction data, one or more default user spending configurations for card usage following flight interruptions.

9. The method of claim 8, further comprising:

detecting a current flight interruption associated with a second user; and based on detecting the current flight interruption associated with the second user, and based on determining that a confidence score of one or more predicted user spending configurations for a card associated with the second user does not satisfy a threshold, updating, based on the one or more default user spending configurations, one or more user spending configurations of the card associated with the second user.

10. The method of claim 1, further comprising:

based on determining an expiration of a duration of the current flight interruption, resetting the one or more user spending configurations of the card.

11. An apparatus comprising:

one or more processors; and one or more memories storing instructions that, when executed by the one or more processors, cause the apparatus to:

receive past flight interruption data indicating a plurality of past flight interruptions;

receive user transaction data indicating card transactions, which were performed during past flight interruptions, associated with a plurality of users;

train, based on the past flight interruption data and the user transaction data, a machine learning model to predict an amount of available credit to be applied, during flight interruptions, to a card associated with a user, wherein the trained machine learning model is configured to generate a predicted amount of available credit based on input historical records for the user;

determine, based on the flight interruption data and the user transaction data, one or more historical records for the user of the plurality of users, wherein each record of the one or more historical records for the user indicates a past flight interruption and one or more performed card transactions associated with the past flight interruption, wherein the one or more performed card transactions were performed via the card associated with the user;

detect a current flight interruption associated with the user;

using the machine learning model and based on the detected current flight interruption, determine, based on the machine learning model and the detected current flight interruption and the one or more historical records for the user, a predicted amount of available credit to be accessible during the current flight interruption to the card associated with the user;

update, based on the predicted amount of available credit, a credit limit of the card associated with the user; and send, to a user device associated with the user, a notification of the updated credit limit.

12. The apparatus of claim 11, wherein the instructions, when executed by the one or more processors, cause the apparatus to determine the one or more historical records for the user further based on data indicating a mapping of a past flight interruption to one or more affected users.

13. The apparatus of claim 11, wherein the card associated with the user comprises a credit card or a virtual card.

14. The apparatus of claim 11, wherein the instructions, when executed by the one or more processors, cause the apparatus to determine, using the machine learning model and based on the detected current flight interruption and the one or more historical records for the user, the predicted amount of available credit by:

selecting, based on the current flight interruption and from the one or more historical records for the user, at least one record; and determining, based on the at least one record, the predicted amount of available credit.

15. The apparatus of claim 11, wherein the instructions, when executed by the one or more processors, cause the apparatus to determine, using the machine learning model and based on the detected current flight interruption and the one or more historical records for the user, the predicted amount of available credit further based on one or more of a date of the current flight interruption, a time of the current flight interruption, a departure location associated with the current flight interruption, or a destination location associated with the current flight interruption.

16. A non-transitory computer-readable medium storing instructions that, when executed by one or more processors, cause the one or more processors to perform steps comprising:
   receiving past flight interruption data indicating a plurality of past flight interruptions;
   receiving user transaction data indicating card transactions, which were performed during past flight interruptions, associated with a plurality of users;
   training, based on the past flight interruption data and the user transaction data, a machine learning model to predict a set of transaction types to be applied, during flight interruptions, to a card associated with a user wherein the trained machine learning model is configured to generate a predicted set of transaction types based on input historical records for the user;
   determining, based on the flight interruption data and the user transaction data, one or more historical records for the user of the plurality of users, wherein each record of the one or more historical records for the user indicates a past flight interruption and one or more performed card transactions associated with the past flight interruption, wherein the one or more performed card transactions were performed via the card associated with the user;
   detecting a current flight interruption associated with the user;
   determining, using the machine learning model and based on the detected current flight interruption and the one or more historical records for the user, a predicted set of transaction types to be applied during the current flight interruption to the card associated with the user; and
   updating, based on the predicted set of transaction types, a set of authorized transaction types of the card associated with the user.

17. The non-transitory computer-readable medium of claim 16, wherein the determining the one or more historical records for the user is further based on data indicating a mapping of a past flight interruption to one or more affected users.

18. The non-transitory computer-readable medium of claim 16, wherein the card associated with the user comprises a credit card or a virtual card.

19. The non-transitory computer-readable medium of claim 16, wherein the determining, using the machine learning model and based on the detected current flight interruption and the one or more historical records for the user, the predicted set of transaction types comprises:
   selecting, based on the current flight interruption and from the one or more historical records for the user, at least one record; and
   determining, based on the at least one record, the predicted set of transaction types.

20. The non-transitory computer-readable medium of claim 16, wherein the determining, using the machine learning model and based on the detected current flight interruption and the one or more historical records for the user, the predicted set of transaction types is further based on one or more of a date of the current flight interruption, a time of the current flight interruption, a departure location associated with the current flight interruption, or a destination location associated with the current flight interruption.

* * * * *